US012583491B2

(12) United States Patent
Heo et al.

(10) Patent No.: US 12,583,491 B2
(45) Date of Patent: Mar. 24, 2026

(54) RAILWAY DISASTER MONITORING SYSTEM

(71) Applicant: IDIS CO., LTD., Daejeon-si (KR)

(72) Inventors: Jun Hyeok Heo, Seoul (KR); Dong Hyeong Seo, Seoul (KR)

(73) Assignee: IDIS CO., LTD., Daejeon-si (KR)

( * ) Notice: Subject to any disclaimer, the term of this patent is extended or adjusted under 35 U.S.C. 154(b) by 674 days.

(21) Appl. No.: 17/990,774

(22) Filed: Nov. 21, 2022

(65) Prior Publication Data

US 2023/0159070 A1 May 25, 2023

(30) Foreign Application Priority Data

Nov. 25, 2021 (KR) ........................ 10-2021-0163951

(51) Int. Cl.
*B61L 23/04* (2006.01)
*G06V 10/26* (2022.01)
*G06V 10/82* (2022.01)

(52) U.S. Cl.
CPC .......... B61L 23/041 (2013.01); G06V 10/267 (2022.01); G06V 10/82 (2022.01); *G06T 2207/20081* (2013.01)

(58) Field of Classification Search
CPC .... B61L 23/041; B61L 27/53; B61L 15/0072; G06V 10/82; G06V 10/26; G06V 10/267;
(Continued)

(56) References Cited

U.S. PATENT DOCUMENTS 11,151,417 B2 * 10/2021 Laradji ..................... G06N 3/08
11,254,331 B2 * 2/2022 Ryu .................... G06F 18/2155
(Continued)

FOREIGN PATENT DOCUMENTS

| CN | 108974044 A | * | 12/2011 | .............. B61K 9/08 |
| CN | 111461088 A | * | 7/2020 | ........... G06V 10/267 |
| EP | 1192597 B1 | * | 12/2002 | ........... G06V 10/255 |
| JP | 2021-060656 A | | 4/2021 | |
| KR | 10-2302476 B1 | | 9/2010 | |

(Continued)

OTHER PUBLICATIONS

Non-final Office Action mailed on Jun. 14, 2024 from the Korean Patent Office for Korean Application No. 10-2021-0163951.

(Continued)

*Primary Examiner* — Cheng Lin

(74) *Attorney, Agent, or Firm* — Insight Law Group, PLLC; Seung Lee

(57) ABSTRACT

Disclosed is a technique for a railway disaster monitoring system for monitoring a foreign matter on a railway, which includes a camera and an image processing unit that receives a railway image captured by the camera. The image processing unit includes a segmented image acquisition unit that obtains a plurality of segmented images including a rail from the railway image received from the camera and scales the segmented images to obtain segmented image blocks of a predetermined size, and a segmented image determination unit which includes deep neural network (DNN) discriminators trained with deep learning neural networks and inputs the segmented image blocks to the DNN discriminators to determine whether the railway is in a normal state in which there is no foreign matter on the railway except a train passing by. Using the segmented images, a foreign matter on a railway can be rapidly and easily determined using a deep learning neural network even with a small number of resources.

10 Claims, 14 Drawing Sheets

(58) Field of Classification Search
CPC ............. G06T 2207/20081; G06T 7/11; G06T
2207/20084; G06N 3/08
See application file for complete search history.

(56) References Cited

U.S. PATENT DOCUMENTS

| | | | | |
|---|---|---|---|---|
| 11,841,922 B2 * | 12/2023 | Lin | ......................... | G06V 20/70 |
| 11,989,888 B2 * | 5/2024 | Chan | ......................... | G06N 3/09 |

FOREIGN PATENT DOCUMENTS

| | | | | | |
|---|---|---|---|---|---|
| KR | 10-0998339 B1 | | 12/2010 | | |
| KR | 10-2021-0030351 A1 | | 3/2021 | | |
| KR | 20210072664 A | * | 6/2021 | ............ | B61D 49/00 |
| WO | WO-2019103836 A1 | * | 5/2019 | ............... | G06T 7/11 |
| WO | 2019/216303 A1 | | 11/2019 | | |

OTHER PUBLICATIONS

Piotr Bjarczak et al., "UAVs in rail damage image diagnostics supported by deep-learning networks", Open Engineering, Jan. 3, 2021.

* cited by examiner

RAILWAY DISASTER MONITORING SYSTEM

CROSS-REFERENCE TO RELATED APPLICATION(S)

This application claims priority from Korean Patent Application No. 10-2021-0163951, filed on Nov. 25, 2021, in the Korean Intellectual Property Office, the disclosure of which is incorporated herein by reference in its entirety.

BACKGROUND

1. Field

The present invention relates to data processing technology, and more particularly, to data processing technology related to a railway disaster monitoring system that determines whether a railway is in a normal state using a discriminator trained with a deep learning neural network.

2. Description of Related Art

Railways are public transportation means that have excellent safety and punctuality and can move large numbers of people. However, since many people are moved at one time through railways, there is a risk that an accident may escalate into a major disaster. Railway accidents can be divided into derailments, collisions, rear-end collisions, accidents at crossings, accidents caused by obstacles, fire explosions, and the like.

Korea is a country with many mountainous areas, and in particular, in Gangwon-do, there are many railways passing through mountainous areas. In a mountainous area, the probability of rockfall increases, and in particular, disasters such as rockfalls, landslides, floods, etc. may occur during heavy rainfall in the summer. When a railway is blocked or lost due to a foreign matter or an obstacle from a disaster such as a rockfall, a landslide, a flood, or the like, an accident such as train derailment or the like may occur.

In order to prevent railway accidents, a railway operator is equipped with a system for monitoring a railway disaster using closed-circuit televisions (CCTVs), drones, or the like in vulnerable areas where rockfalls, landslides, or the like can occur. When falling rocks or the like are identified in a captured image of a railway, an accident can be prevented by transmitting relevant information to trains passing near the railway.

Korean Patent Registration No. 10-0998339, published on Dec. 3, 2010, relates to a railway monitoring system, and discloses a railway monitoring system including a laser radar sensor unit that detects an obstacle while scanning an entire area of a railway to be monitored, and a control unit that transmits an image of a photographing unit to a train engine room and a local situation room when it is determined by the laser radar sensor unit that an obstacle has appeared on the railway it is monitoring.

Korean Patent Registration No. 10-2302476, published on Sep. 15, 2021, relates to a real-time railway obstacle detection system, and discloses a real-time railway obstacle detection system that evaluates and informs of a risk of an obstacle by specifying a railway area based on data for an image captured by a camera mounted on a vehicle on the railway and detecting a group of pre-selected obstacle candidates.

However, since the techniques disclosed in the above patent documents use an entirety of the image, it is difficult to rapidly and accurately determine an obstacle on the railway.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a railway disaster monitoring system that accurately determines whether an obstacle is present in a railway image received from a camera in a short time.

The following description also relates to a railway disaster monitoring system that automatically generates segmented image blocks for use in a deep learning neural network from a railway image.

The following description also relates to a railway disaster monitoring system that can determine whether a train is passing through a railway.

In one general aspect, a railway disaster monitoring system for monitoring a foreign matter on a railway includes a camera and an image processing unit that receives a railway image captured by the camera.

The image processing unit may include a segmented image acquisition unit configured to obtain a plurality of segmented images including the rail from the railway image received from the camera and scale the segmented images to obtain segmented image blocks of a predetermined size, and a segmented image determination unit, which includes a first deep neural network (DNN) discriminator trained with a deep learning neural network and inputs the segmented image blocks to the first DNN discriminator and determines whether the railway is in a normal state in which there is no foreign matter on the railway.

The image processing unit may further include a segmented image area setting unit configured to set areas of the plurality of segmented images that are gradually reduced according to a perspective of the rail and overlap each other in the railway image received from the camera.

The segmented image determination unit may further include a segmented image verification unit that, when it is determined by the first DNN discriminator that there is a block in which the railway is not determined to be in the normal state, checks whether the corresponding block is still not determined to be in the normal state even after an abnormal state duration has elapsed.

The segmented image determination unit may further include a second DNN discriminator that receives the segmented image blocks and further checks whether an abnormal state of the railway determined by the first DNN discriminator is correct when it is not determined by the first DNN discriminator that the railway is in the normal state, wherein the second DNN discriminator is trained with the deep learning neural network.

The image processing unit may further include an alarm transmission unit configured to transmit an alarm to an external device when it is determined by the segmented image determination unit that there is a foreign matter on the railway.

In another general aspect, a railway disaster monitoring system for monitoring a foreign matter on a railway includes a camera, an image processing unit including a segmented image acquisition unit that obtains a plurality of segmented images including a rail from a railway image received from the camera and scales the segmented images to obtain segmented image blocks of a predetermined size, and a first DNN discriminator that determines whether the railway is in a normal state in which there is no foreign matter on the railway, and a rail management server connected to the image processing unit via a network.

The rail management server may include a second DNN discriminator trained with a deep learning neural network and configured to receive the segmented image blocks and further check whether an abnormal state of the railway determined by the first DNN discriminator is correct when it is not determined by the first DNN discriminator that the railway is in the normal state.

The rail management server may further include an alarm transmission unit configured to transmit an alarm to an external device when it is determined by the second DNN discriminator that there is a foreign matter on the railway.

In still another general aspect, a railway disaster monitoring system for monitoring a foreign matter on a railway includes a camera and a rail management server which is connected to the camera via a network to receive a railway image captured by the camera.

The rail management server may include a segmented image acquisition unit configured to obtain a plurality of segmented images including a rail from the railway image received from the camera and scale the segmented images to obtain segmented image blocks of a predetermined size, and a segmented image determination unit, which includes a first DNN discriminator trained with a deep learning neural network and inputs the segmented image blocks to the first DNN discriminator and determines whether the railway is in a normal state in which there is no foreign matter on the railway.

The rail management server may further include a segmented image area setting unit configured to set areas of the plurality of segmented images that are gradually reduced according to a perspective of the rail and overlap each other in the railway image received from the camera.

The segmented image determination unit may further include a segmented image verification unit that, when it is determined by the first DNN discriminator that there is a block in which the railway is not determined to be in the normal state, checks whether the corresponding block is still not determined to be in the normal state even after an abnormal state duration has elapsed.

The segmented image determination unit may further include a second DNN discriminator that receives the segmented image blocks and further checks whether an abnormal state of the railway determined by the first DNN discriminator is correct when it is not determined by the first DNN discriminator that the railway is in the normal state, wherein the second DNN discriminator is trained with the deep learning neural network.

The rail management server may further include an alarm transmission unit configured to transmit an alarm to an external device when it is determined by the segmented image determination unit that there is a foreign matter on the railway.

Other features and aspects will be apparent from the following detailed description, the accompanying drawings, and the claims.

Figure 1:
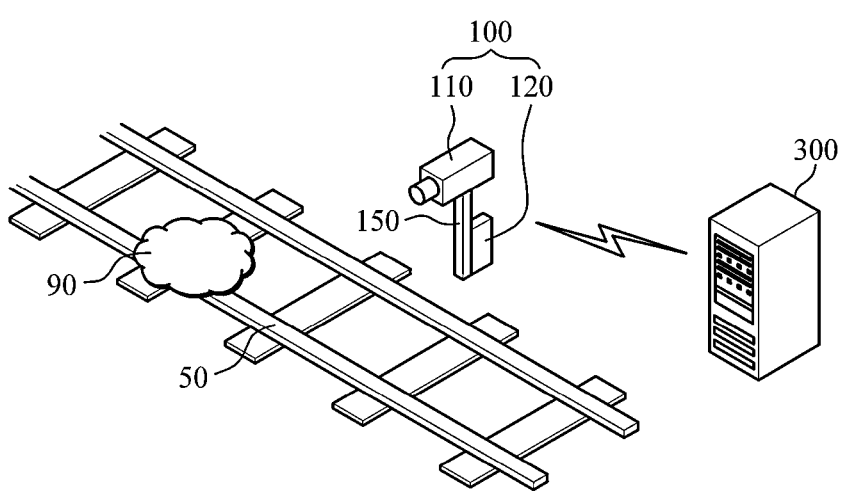
FIG. 1 is a configuration diagram schematically illustrating a configuration of a railway disaster monitoring system according to a first embodiment.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects are embodied through embodiments described with reference to the accompanying drawings. It should be understood that various combinations of elements of each embodiment are possible within embodiments or with elements of other embodiments unless otherwise stated or in the case of contradiction. Terms used in this specification and the claims should be interpreted with meanings and concepts which are consistent with the technological scope of the present invention based on the principle that the inventors have appropriately defined concepts of terms in order to describe the present invention in the best way. In this specification, a module or part may be implemented as a set of a storage device such as a memory, a hard disk drive (HDD), a solid-state drive (SSD), etc., in which program instructions executable by a computer or processor are stored, a processor capable of executing these instructions, and electronic circuits such as application-specific integrated circuits (ASICs), field-programmable gate arrays (FPGAs), etc. In addition, the operation of each module or part may be divided and performed by a plurality of processors, or the operation of a plurality of modules or parts may be performed using one processor.

Hereinafter, exemplary embodiments of the present invention will be described in detail with reference to the accompanying drawings.

FIG. 1 is a configuration diagram schematically illustrating a configuration of a railway disaster monitoring system according to a first embodiment.

According to an aspect of the proposed invention, a railway disaster monitoring system for monitoring a foreign matter 90 on a railway 50 may include a camera 110 and an image processing unit 200 that receives a railway image captured by the camera. The railway disaster monitoring system is a system for detecting that a railway has entered a state in which it is difficult to operate a train normally, such as when the railway is lost due to a disaster such as a rockfall, a landslide, a flood, or the like.

According to an additional aspect, the camera 110 may be installed on a support 150.

According to an additional aspect, an image processing unit may be connected to a camera via a wired/wireless communication network to receive a railway image from the camera. The image processing unit 200 may be installed integrally with the camera or may be installed near the camera and connected to the camera via a short-distance communication network using a serial communication method or the like.

Figure 7:
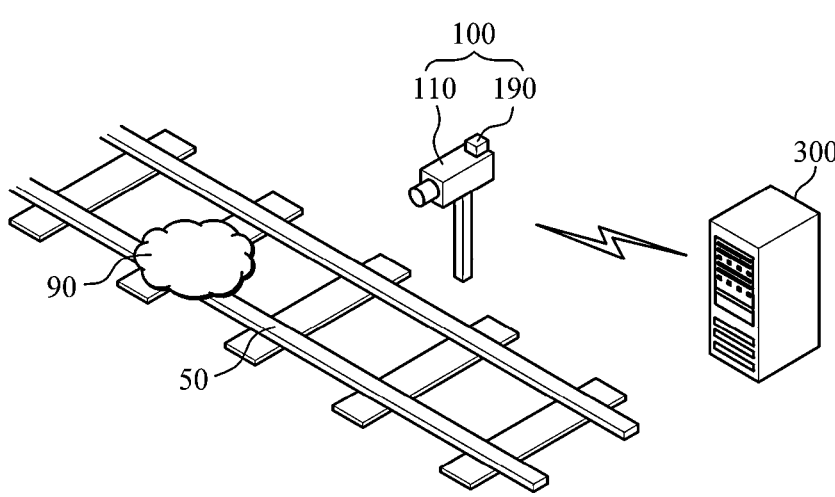
FIG. 7 is a configuration diagram schematically illustrating a configuration of a railway disaster monitoring system according to a fourth embodiment.

According to an additional aspect, the image processing unit 200 may be implemented using electronic parts such as integrated circuits, or may be implemented using a storage device such as a memory or the like in which program instructions are stored, and a computer device including a processor for executing the instructions. The image processing unit 200 may be implemented in a rail management server 300 remotely connected to the camera, as illustrated in FIG. 7.

According to another aspect of the proposed invention, the railway disaster monitoring system for monitoring the foreign matter on the railway includes a camera 110, an image processing unit 200 that determines whether the railway is in a normal state in which there is no foreign matter thereon from a railway image received from the camera, and a rail management server 300 connected to the image processing unit 200 via a network.

A camera unit 100 includes the camera 110 and the image processing unit 200 installed near the camera 110. The camera unit 100 is connected to a remote rail management server 300 via the wired/wireless communication network.

Figure 2:
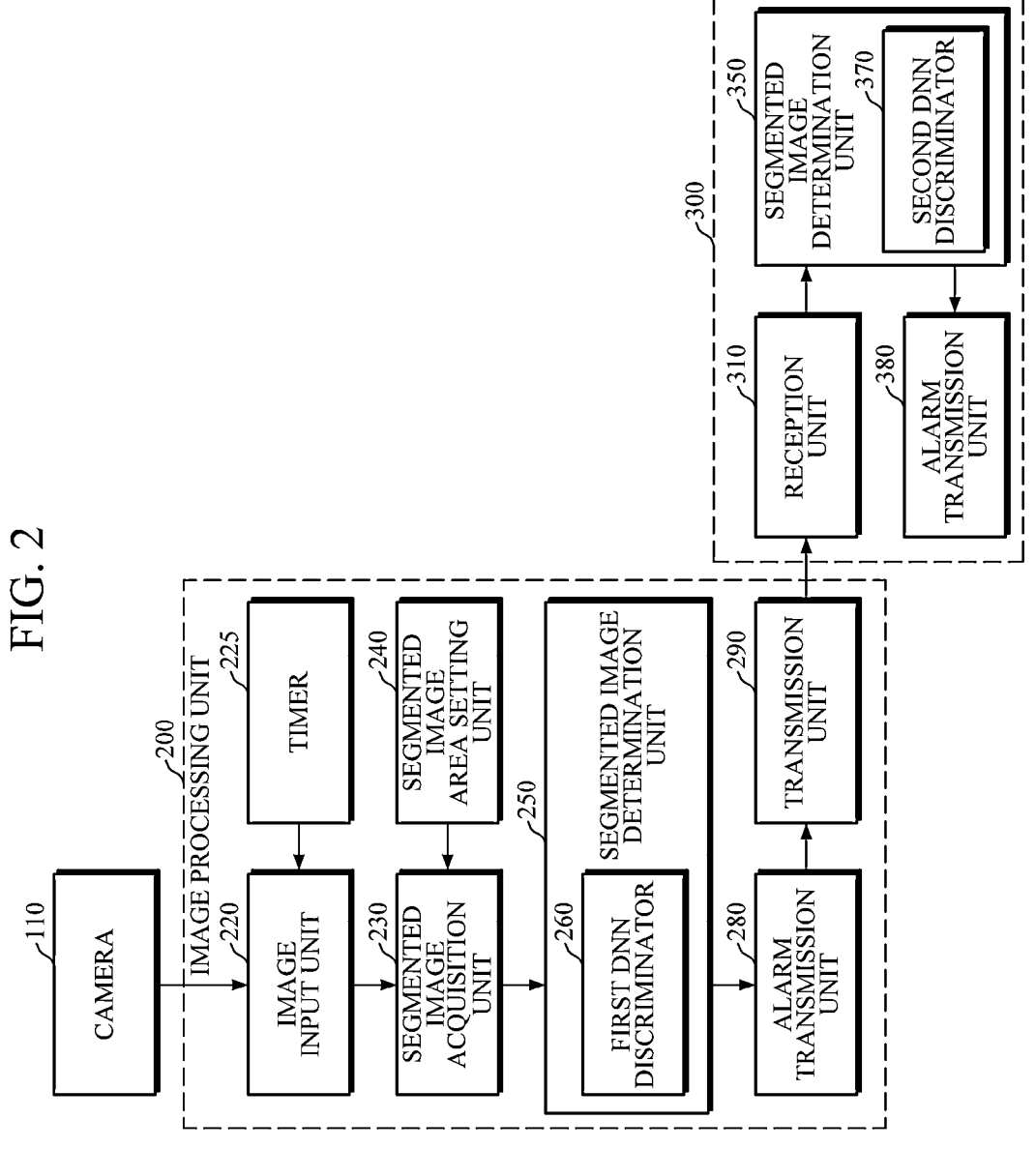
FIG. 2 is a configuration diagram specifically illustrating the configuration of the railway disaster monitoring system according to the first embodiment.

FIG. 2 is a configuration diagram specifically illustrating the configuration of the railway disaster monitoring system according to the first embodiment.

According to an additional aspect, the image processing unit 200 includes a segmented image acquisition unit 230 that obtains a plurality of segmented images including a rail from the railway image received from the camera 110 and scales the segmented images to obtain segmented image blocks of a predetermined size.

According to an additional aspect, the image processing unit 200 includes a timer 225. The image received from the camera may be transmitted to an image input unit 220 at a preset measurement time period using the timer 225 and stored in an HDD, an SSD, a memory, or the like.

In order to determine whether there is an abnormality on the railway using an entirety of the railway image received from the camera 110, many computer system resources are required and much calculation time is required. Therefore, in order to efficiently determine whether there is an abnormality on the railway, segmented images obtained by segmenting the railway image are used instead of the entirety of the railway image.

Figure 4:
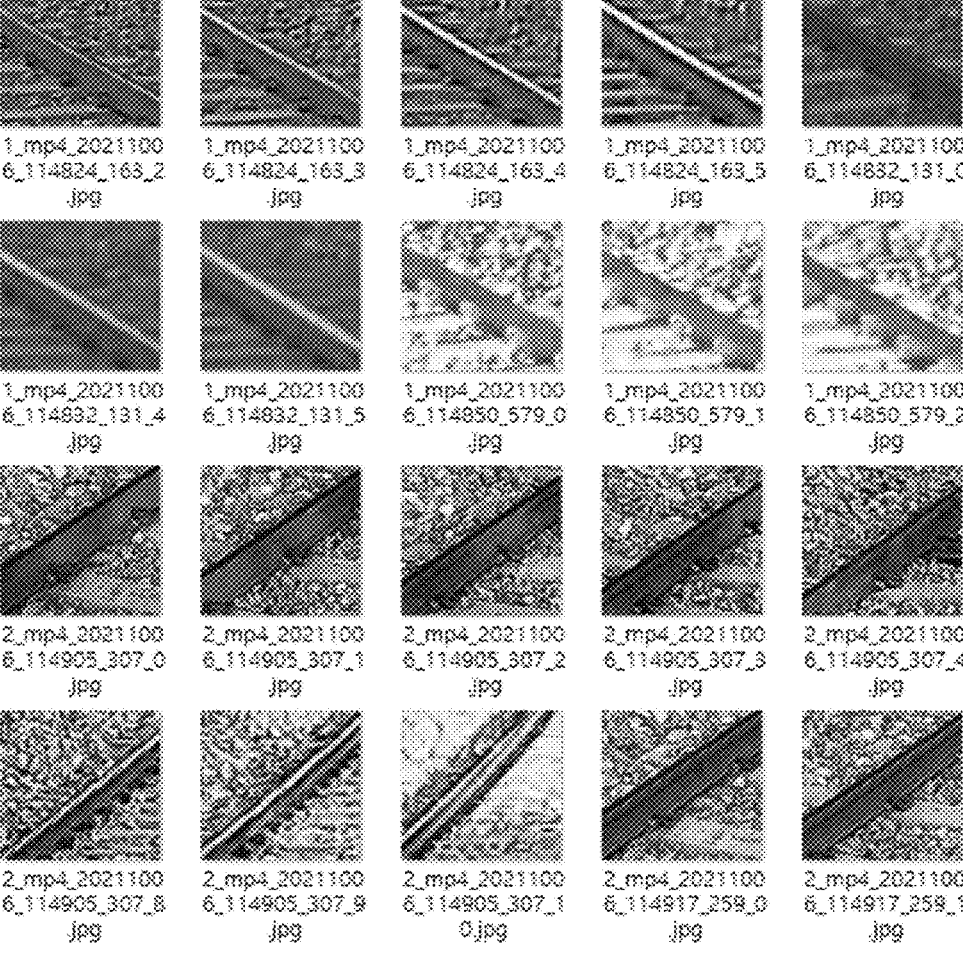
FIG. 4 shows photographs of segmented image blocks obtained by a segmented image acquisition unit of the railway disaster monitoring system according to the first embodiment.

Since the railway image captured by the camera has a perspective, the segmented images also have different sizes. Segmented image blocks are obtained by scaling the segmented images to have the same size. FIG. 4 shows examples of the segmented image blocks. The segmented image blocks may be stored on an HDD, an SSD, a memory, or the like.

According to an additional aspect, the image processing unit 200 includes a segmented image determination unit 250 that determines whether the railway is in a normal state in which there is no foreign matter thereon. The segmented image determination unit 250 includes a first deep neural network (DNN) discriminator 260 trained with a deep learning neural network. The segmented image determination unit 250 inputs the segmented image blocks to the first DNN discriminator 260 to comprehensively determine whether the railway is in the normal state in which there is no foreign matter thereon. When it is determined that the railway is in the normal state, the image processing unit 200 repeats the process of receiving the image from the camera at the measurement time period.

According to an additional aspect, the image processing unit 200 further includes an alarm transmission unit 280 that transmits an alarm to an external device when it is determined by the segmented image determination unit 250 that there is a foreign matter on the railway. The alarm transmission unit 280 may be connected to an external speaker to generate an alarm sound. The alarm transmission unit 280 may transmit a warning message to a manager's terminal connected to the wired/wireless communication network.

According to an additional aspect, the rail management server 300 includes a second DNN discriminator 370 that receives the segmented image blocks and further checks whether an abnormal state of the railway determined by the first DNN discriminator is correct when it is not determined by the first DNN discriminator 260 that the railway is in the normal state, wherein the second DNN discriminator 370 is trained with the deep learning neural network.

When it is determined by the segmented image determination unit 250 including the first DNN discriminator 260 that there is a dangerous foreign matter on the railway, an alarm may be immediately transmitted to an external device through an alarm transmission unit 380 without using the second DNN discriminator 370. On the other hand, when additional determination is required, such as whether or not a train is passing or the like, a segmented image determination unit 350 including the second DNN discriminator 370 in the rail management server 300 may be used.

The segmented image determination unit 350 may determine that some segmented image blocks obtained by photographing a space between trains among the train passing images are not for the train passing image due to an error of the second DNN discriminator 370. Therefore, when the number of blocks detected as the train passing image exceeds a certain number, the entire segmented image blocks of the corresponding image may be determined as the train passing image. That is, the segmented image determination unit 350 comprehensively determines the entire segmented image blocks instead of one segmented image block, and determines whether the image is an image in which a train passes or an image indicating an abnormal state of the railway.

The rail management server 300 is connected to the image processing unit 200 via a wired/wireless network. When it is not determined by the first DNN discriminator 260 that the railway is in the normal state, the image processing unit 200 may transmit the segmented image blocks to the rail management server 300. The rail management server 300 that has received the segmented image blocks inputs the segmented image blocks to the segmented image determination unit 350 including the second DNN discriminator 370 and further checks whether the railway is in the abnormal state.

The second DNN discriminator 370 may determine an additional state with respect to the abnormal state of the railway determined by the first DNN discriminator 260. For example, when it is determined by the first DNN discriminator 260 that the railway is in the abnormal state, the second DNN discriminator 370 trained about the train passing may be used to further check whether the train has passed.

According to an additional aspect, the rail management server 300 further includes an alarm transmission unit 380 that transmits an alarm to an external device when it is determined by the second DNN discriminator 370 that there is a foreign matter on the railway. The alarm transmission unit 380 may be connected to an external speaker to generate an alarm sound. The alarm transmission unit 380 may transmit a warning message to the manager's terminal connected to the wired/wireless communication network.

Figure 3:
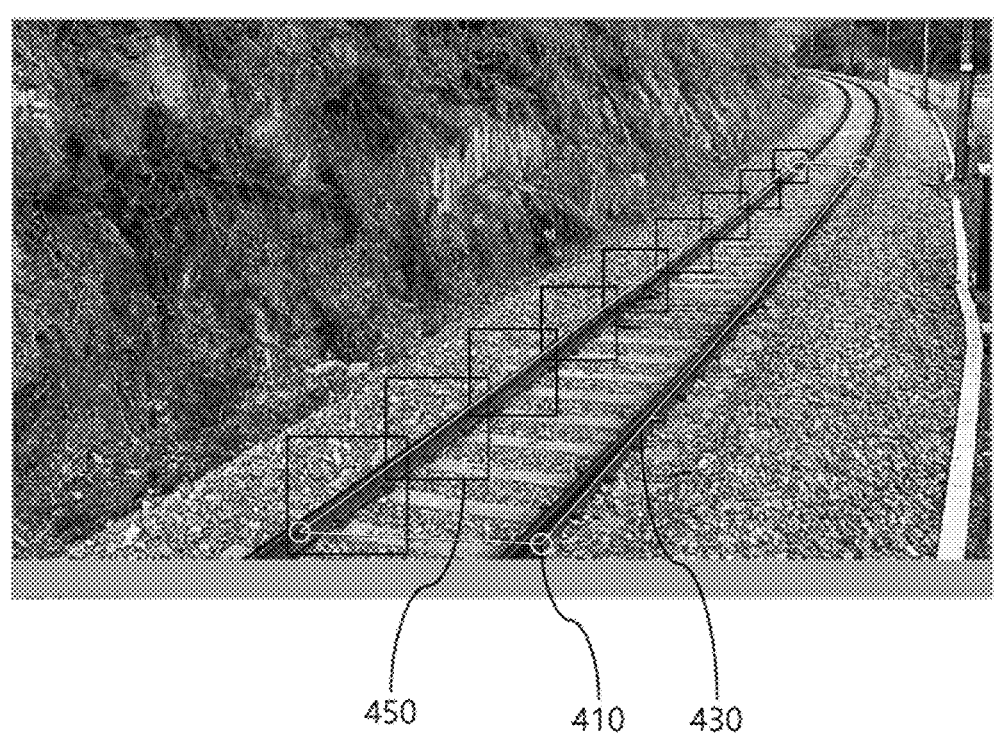
FIG. 3 is a photograph showing a state in which a segmented image area setting unit of the railway disaster monitoring system according to the first embodiment sets areas of segmented images.

FIG. 3 is a photograph showing a state in which a segmented image area setting unit of the railway disaster monitoring system according to the first embodiment sets areas of segmented images.

According to an additional aspect, the image processing unit 200 further includes a segmented image area setting unit 240 that sets areas of a plurality of segmented images that are gradually reduced according to a perspective of the rail and overlap each other in the railway image received from the camera 110.

Because the variety of railway images is too large and there are cases where only a part of a railway is partially lost, training the entire railway image with an artificial intelligence neural network consumes many computing resources, takes a long time, and has poor accuracy. According to an embodiment of the present invention, the railway is segmented into blocks of a certain size, and it is determined whether the railway in the segmented blocks is in an abnormal state in which the railway is covered with a foreign matter.

The segmented image area setting unit 240 receives information on an area to be monitored in the railway image received from the camera. In this case, four green points 410 on the railway rail may be input. Since the image captured by the camera has a perspective, an area formed by the four points forms a red trapezoid 430.

The segmented image area setting unit 240 segments the red trapezoidal monitoring area into a plurality of segmented images. Since the segmented images should have the same shape so that the first DNN discriminator 260 can rapidly and accurately discriminate the segmented images, the images are segmented to gradually become smaller according to the perspective of the rail.

The segmented images are segmented to overlap each other so that no missing parts occur. As a result, the segmented image area setting unit 240 may set areas of the plurality of segmented images with gradually reducing sizes and intervals as indicated by blue quadrangles 450.

In order to prevent missing parts from occurring, the blue quadrilateral areas may be set to overlap one of left and right sides of the red trapezoid. The foremost quadrilateral area starts from one corner of the trapezoid, and a length of one side may be obtained by multiplying a length of a lower side of the trapezoid by a proportional constant. For example, the proportional constant may be ½.

A starting point of the next quadrilateral area is set at a position overlapping the previous quadrilateral area by moving a starting point of the previous quadrilateral area in parallel to one side of the trapezoid, but not to deviate from the previous quadrilateral area. For example, the next starting point may be set at ¾ of a vertical or horizontal length within the previous quadrangle.

A length of one side of the next quadrilateral area may be obtained by multiplying the length of the lower side by the proportional constant in the trapezoid in which the position of the lower side is moved to the new starting point in the existing trapezoid. When such a process is repeated until the starting point of the new quadrilateral area exceeds the trapezoidal area, the image may be segmented without missing parts.

FIG. 4 shows photographs of segmented image blocks obtained by the segmented image acquisition unit of the railway disaster monitoring system according to the first embodiment.

According to an additional aspect, the image processing unit 200 includes a segmented image acquisition unit 230 that obtains a plurality of segmented images including a rail from a railway image received from the camera 110 and scales the segmented images to obtain segmented image blocks of a predetermined size.

The image obtained by the camera is segmented into the areas set by the segmented image area setting unit. When the segmented areas are set, the rail in an inclined direction is included in the segmented areas so that it is easy to determine a foreign matter on the railway in the image. Meanwhile, since the segmented images have different sizes depending on the perspective, the segmented images are scaled to have the same size. The segmented image blocks of the same size may be stored on an HDD, an SSD, a memory, or the like.

Figure 5:
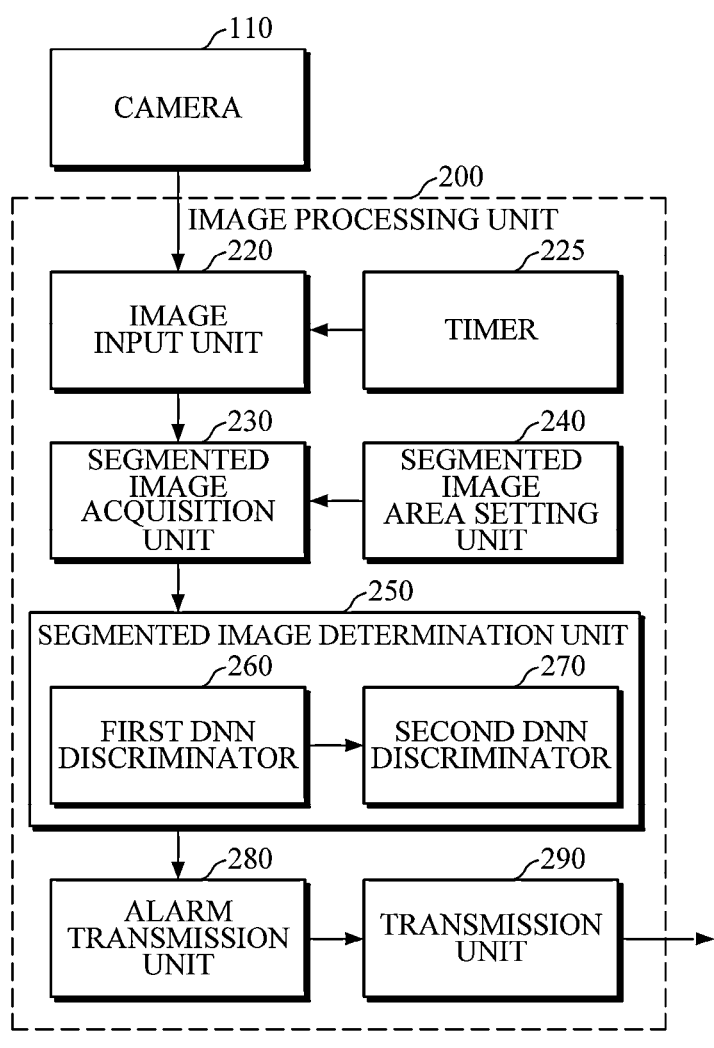
FIG. 5 is a configuration diagram specifically illustrating a configuration of an image processing unit of a railway disaster monitoring system according to a second embodiment.

FIG. 5 is a configuration diagram specifically illustrating a configuration of an image processing unit of a railway disaster monitoring system according to a second embodiment.

According to an additional aspect, the segmented image determination unit 250 of the image processing unit 200 further includes a second DNN discriminator 270 that receives the segmented image blocks further checks whether an abnormal state of the railway determined by the first DNN discriminator is correct when it is not determined by the first DNN discriminator 260 that the railway is in a normal state, wherein the second DNN discriminator 270 is trained with a deep learning neural network.

When there is no rail management server 300 in FIG. 1, the image processing unit 200 may include a second DNN discriminator 270. When it is determined by the first DNN discriminator 260 that the railway is in the normal state in a specific segmented block, the segmented image determination unit 250 inputs the segmented image blocks to the second DNN discriminator 270 and further checks whether the railway is in the abnormal state.

The second DNN discriminator 270 may determine an additional state with respect to the abnormal state of the railway determined by the first DNN discriminator 260. For example, when it is determined by the first DNN discriminator 260 that the railway is in the abnormal state, the second DNN discriminator trained about whether a train is passing may be used to further check for a passing train.

The segmented image determination unit 250 may determine that some segmented image blocks obtained by photographing a space between trains among the train passing images are not for the train passing image due to an error of the second DNN discriminator 270. Therefore, when the number of blocks detected as the train passing image exceeds a certain number, the entire segmented image blocks of the corresponding image may be determined as the train passing image. That is, the segmented image determination unit 250 comprehensively determines the entire segmented image blocks instead of one segmented image block, and determines whether the image is an image in which a train passes or an image indicating an abnormal state of the railway.

Figure 6:
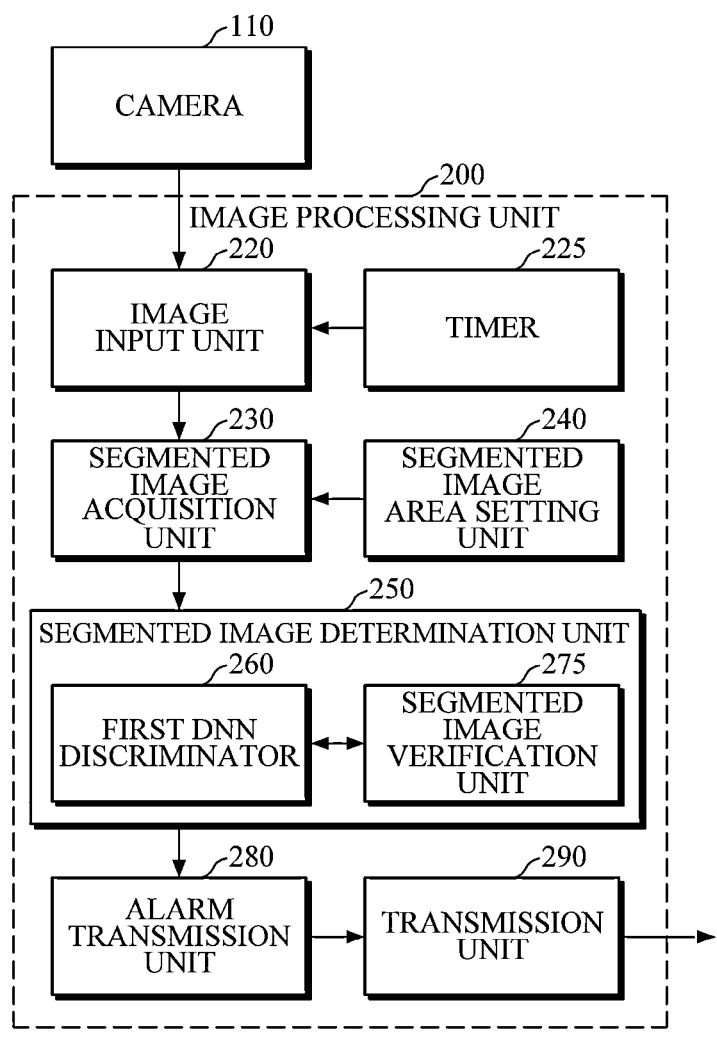
FIG. 6 is a configuration diagram specifically illustrating a configuration of an image processing unit of a railway disaster monitoring system according to a third embodiment.

FIG. 6 is a configuration diagram specifically illustrating a configuration of an image processing unit of a railway disaster monitoring system according to a third embodiment.

According to an additional aspect, the segmented image determination unit 250 of the image processing unit 200 further includes a segmented image verification unit 275 that checks whether the corresponding block is still not determined to be in a normal state even after an abnormal state duration has elapsed when it is determined by the first DNN discriminator 260 that there is a block in which the railway is not determined to be in the normal state.

When the image processing unit 200 further includes the second DNN discriminator 270, additional computing resources are required. Since an object passing briefly on the railway or a train passing on the railway is not a foreign matter that poses an obstacle to the railway, an alarm should not be generated. To this end, the segmented image determination unit 250 includes the segmented image verification unit 275.

The segmented image verification unit 275 determines whether the abnormal state continues for more than a preset abnormal state duration when it is determined by the first DNN discriminator 260 that the railway is in the abnormal state rather than the normal state in a specific segmented block.

When it is determined that the railway is still in the abnormal state even after the abnormal state duration has elapsed, an alarm is transmitted to an external speaker or a manager's terminal speaker through the alarm transmission unit 280. The alarm may be transmitted to an external device through a transmission unit 290 connected to an external wired/wireless communication network.

A period of time during which the train passes through a monitoring area may be set as an abnormal state duration. For example, a period of time in which the longest and slowest train passes through the monitoring area may be set as the abnormal state duration.

FIG. 7 is a configuration diagram schematically illustrating a configuration of a railway disaster monitoring system according to a fourth embodiment.

According to still another aspect of the proposed invention, a railway disaster monitoring system for monitoring a foreign matter on a railway includes a camera 110 and a rail management server 300 which is connected to the camera 110 via a network to receive a railway image captured by the camera 110.

Figure 8:
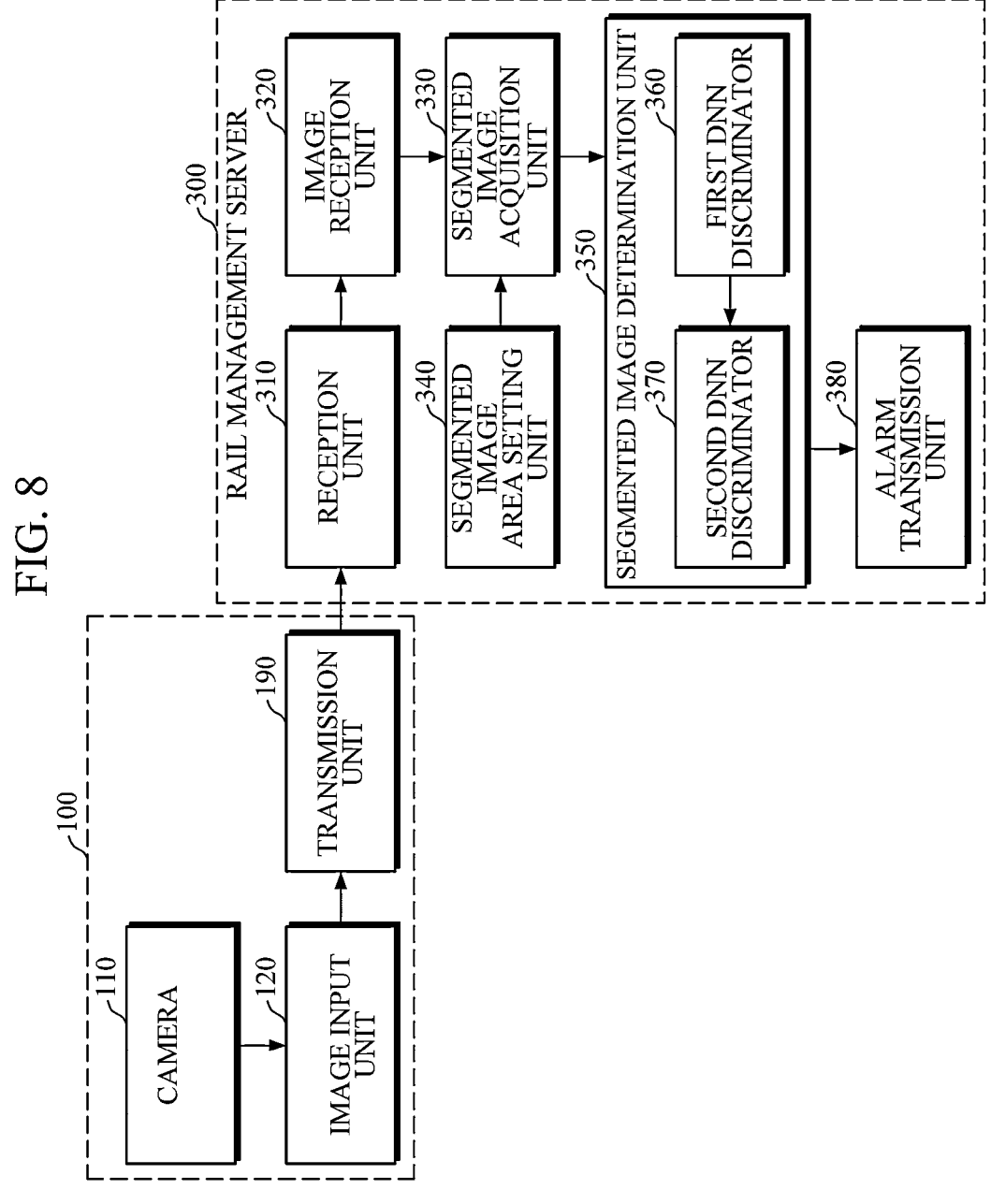
FIG. 8 is a configuration diagram specifically illustrating the configuration of the railway disaster monitoring system according to the fourth embodiment.

FIG. 8 is a configuration diagram specifically illustrating the configuration of the railway disaster monitoring system according to the fourth embodiment.

According to an additional aspect, a camera unit 100 includes a camera 110, an image input unit 120 that receives an image captured by the camera 110, and a transmission unit 190 that is an interface that can connect to a network.

According to an additional aspect, the rail management server 300 includes a reception unit 310 that receives a signal transmitted from the transmission unit 190 of the camera unit 100, and an image reception unit 320 that stores a railway image, which is received from the camera 110 and received through the reception unit 310, on an HDD, an SSD, a memory, or the like. The rail management server 300 may include a timer and receive the railway image from the camera for each preset measurement period.

According to an additional aspect, the rail management server 300 further includes a segmented image area setting unit 340 that sets areas of a plurality of segmented images that are gradually reduced according to a perspective of the rail and overlap each other in the railway image received from the camera 110.

According to an additional aspect, the rail management server 300 includes a segmented image acquisition unit 330 and a segmented image determination unit 350.

The segmented image acquisition unit 330 obtains a plurality of segmented images including rails from a railway image received from the camera 110 and scales the segmented images to obtain segmented image blocks of a predetermined size.

The segmented image determination unit 350 includes a first DNN discriminator 360 trained with a deep learning neural network. The segmented image determination unit 350 inputs the segmented image blocks to the first DNN discriminator and comprehensively determines whether the railway is in a normal state in which there is no foreign matter thereon.

When it is determined that the railway is in the normal state, the process in which the segmented image blocks are generated by receiving the railway image from the camera according to a preset measurement period and it is determined whether the railway is in the normal state with respect to the segmented image blocks is repeated.

According to an additional aspect, the segmented image determination unit 350 further includes a second DNN discriminator 370 which receives the segmented image blocks and further checks whether an abnormal state of the railway determined by the first DNN discriminator is correct when it is not determined by the first DNN discriminator 360 that the railway is in the normal state in the specific segmented block, wherein the second DNN discriminator 370 is trained with the deep learning neural network.

According to an additional aspect, the rail management server 300 further includes an alarm transmission unit 380 that transmits an alarm to an external device when it is determined by the segmented image determination unit 350 that there is a foreign matter on the railway.

Figure 9:
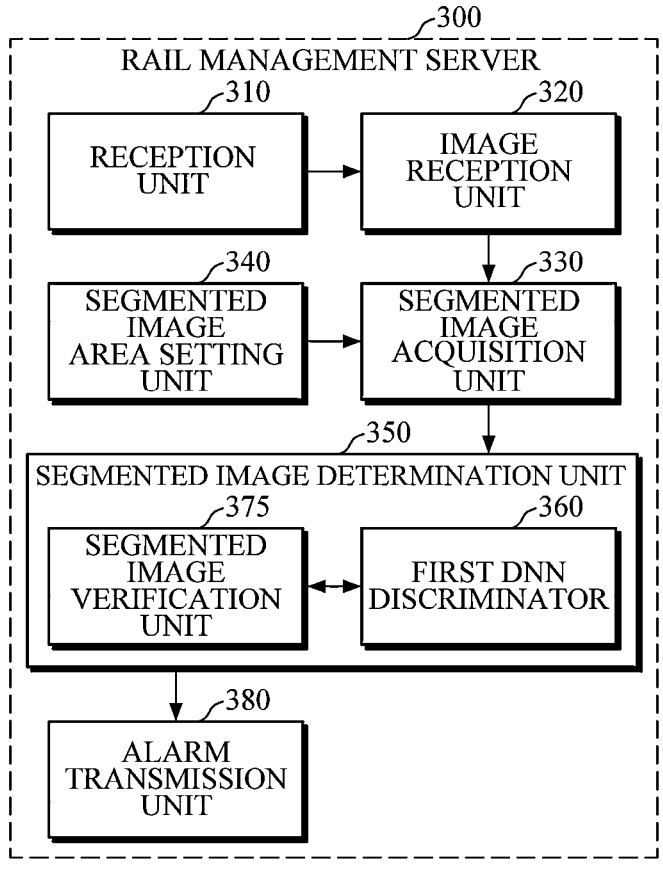
FIG. 9 is a configuration diagram specifically illustrating a configuration of a rail management server of a railway disaster monitoring system according to a fifth embodiment.

FIG. 9 is a configuration diagram specifically illustrating a configuration of a rail management server of a railway disaster monitoring system according to a fifth embodiment.

According to an additional aspect, a segmented image determination unit 350 of a rail management server 300 further includes a segmented image verification unit 375 that checks a result of determination by inputting segmented image blocks obtained from an image received from the camera to a first DNN discriminator after a re-measurement time period has elapsed when it is not determined by the first DNN discriminator 360 that the railway is in the normal state.

The segmented image determination unit 350 further includes the segmented image verification unit 375 that checks whether the corresponding block is still not determined to be in a normal state even after an abnormal state duration has elapsed when it is determined by the first DNN discriminator 360 that there is a block in which the railway is not determined to be in the normal state.

Figure 10:
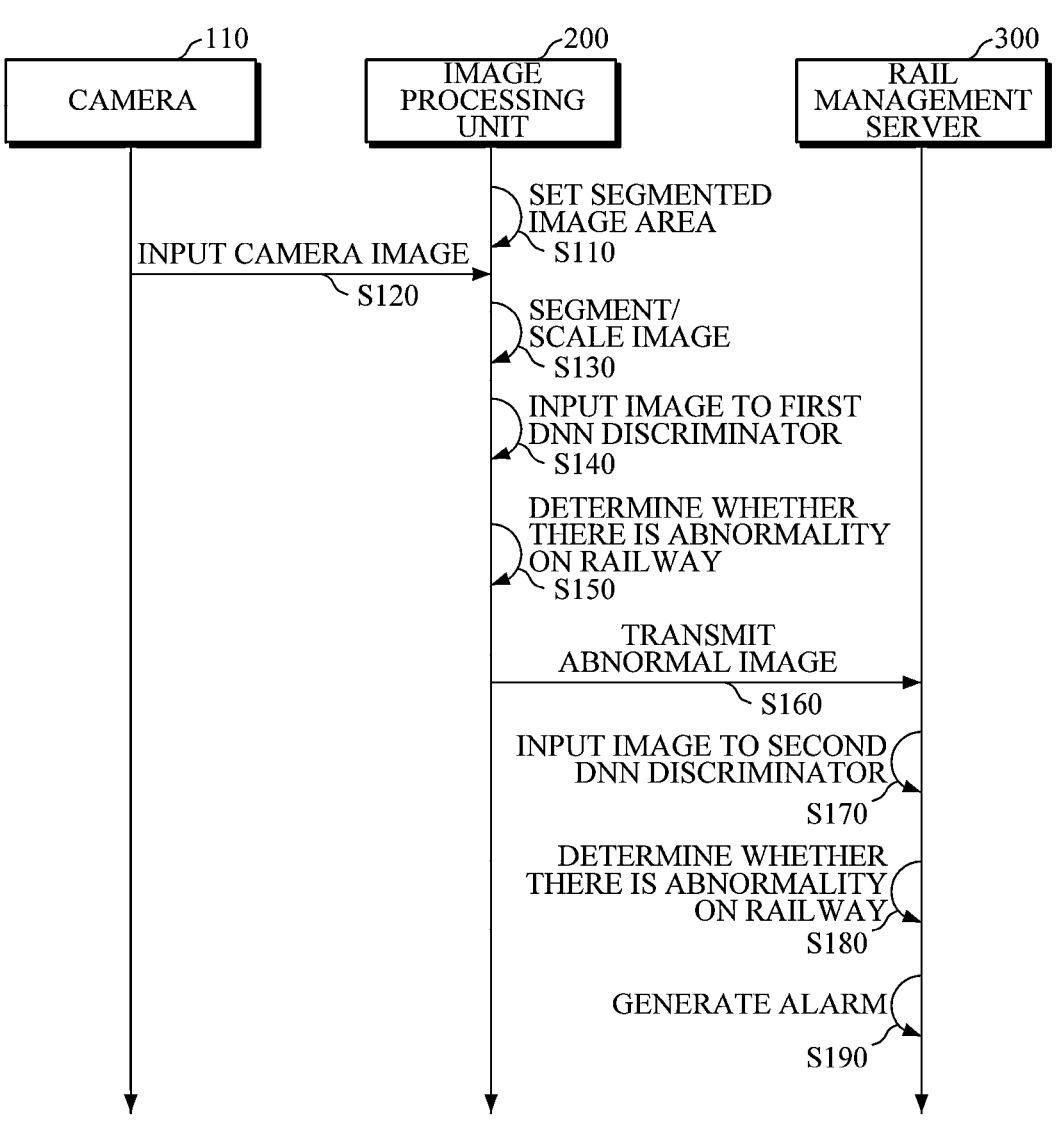
FIG. 10 is a flowchart illustrating a method of monitoring a railway disaster by the railway disaster monitoring system according to the first embodiment.

FIG. 10 is a flowchart illustrating a method of monitoring a railway disaster by the railway disaster monitoring system according to the first embodiment.

The image processing unit 200 receives information on a portion to be monitored for an image received from the camera, and automatically sets an area in which a segmented image is to be generated for the received portion to be monitored (S110).

When the image processing unit 200 receives the image from the camera 110 (S120), the image processing unit 200 segments the image into set segmented image areas, and scales the segmented images to have a predetermined size to generate segmented image blocks (S130).

The image processing unit 200 inputs the segmented image blocks to the first DNN discriminator (S140), and checks a result of the first DNN discriminator to determine whether the railway is in a normal state or an abnormal state in which a foreign matter is present (S150). When it is determined that the railway is in the normal state, the process returns to the process (S120) of receiving the image from the camera at a preset measurement time period and is repeated.

When it is determined that the railway is in the abnormal state, the image processing unit 200 transmits the segmented image blocks to the rail management server 300.

The rail management server 300 inputs the received segmented image blocks to the second DNN discriminator (S170), and checks a result of the second DNN discriminator to determine whether the railway is in a normal state or an abnormal state in which a foreign matter is present (S180). The rail management server 300 may generate an alarm when it is determined that the railway is in the abnormal state (S190). The alarm may be transmitted to a speaker or a manager's terminal connected to a wired/wireless network.

Figure 11:
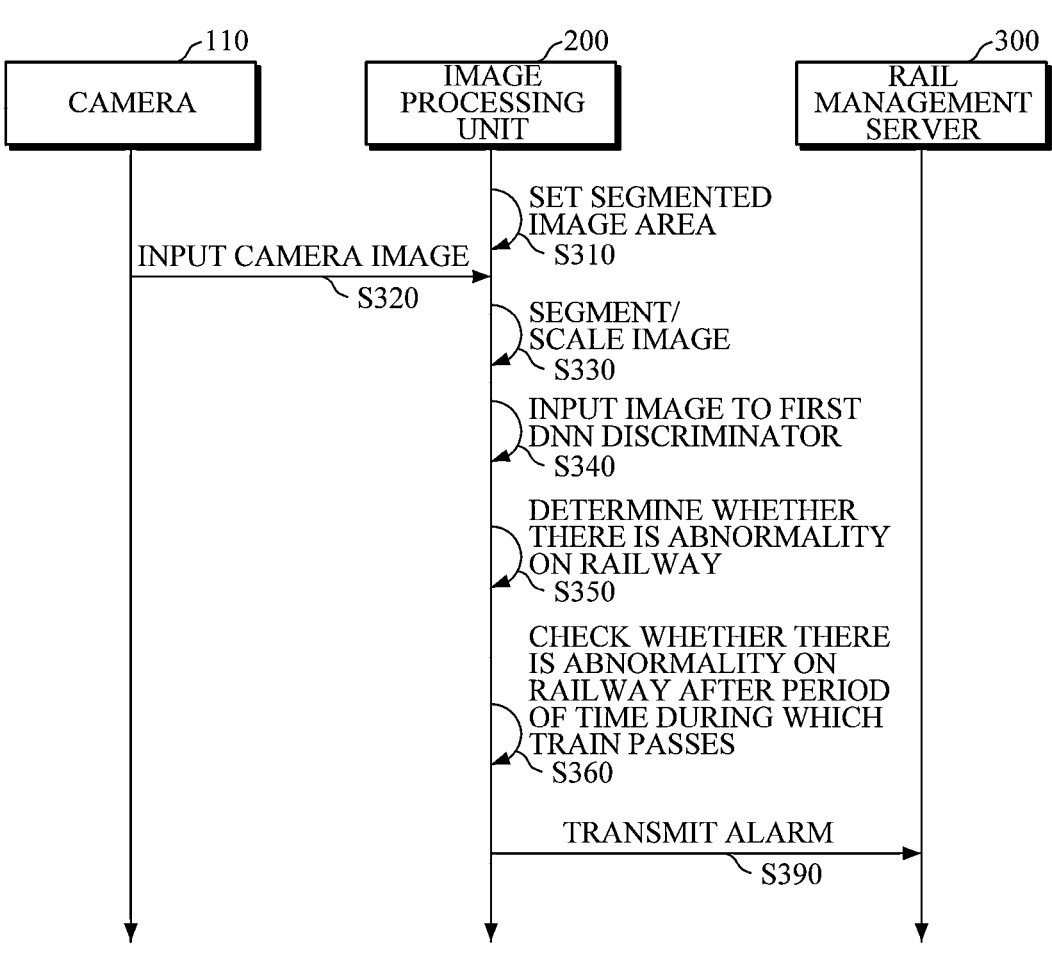
FIG. 11 is a flowchart illustrating a method of monitoring a railway disaster by the railway disaster monitoring system according to the third embodiment.
Figure 12:
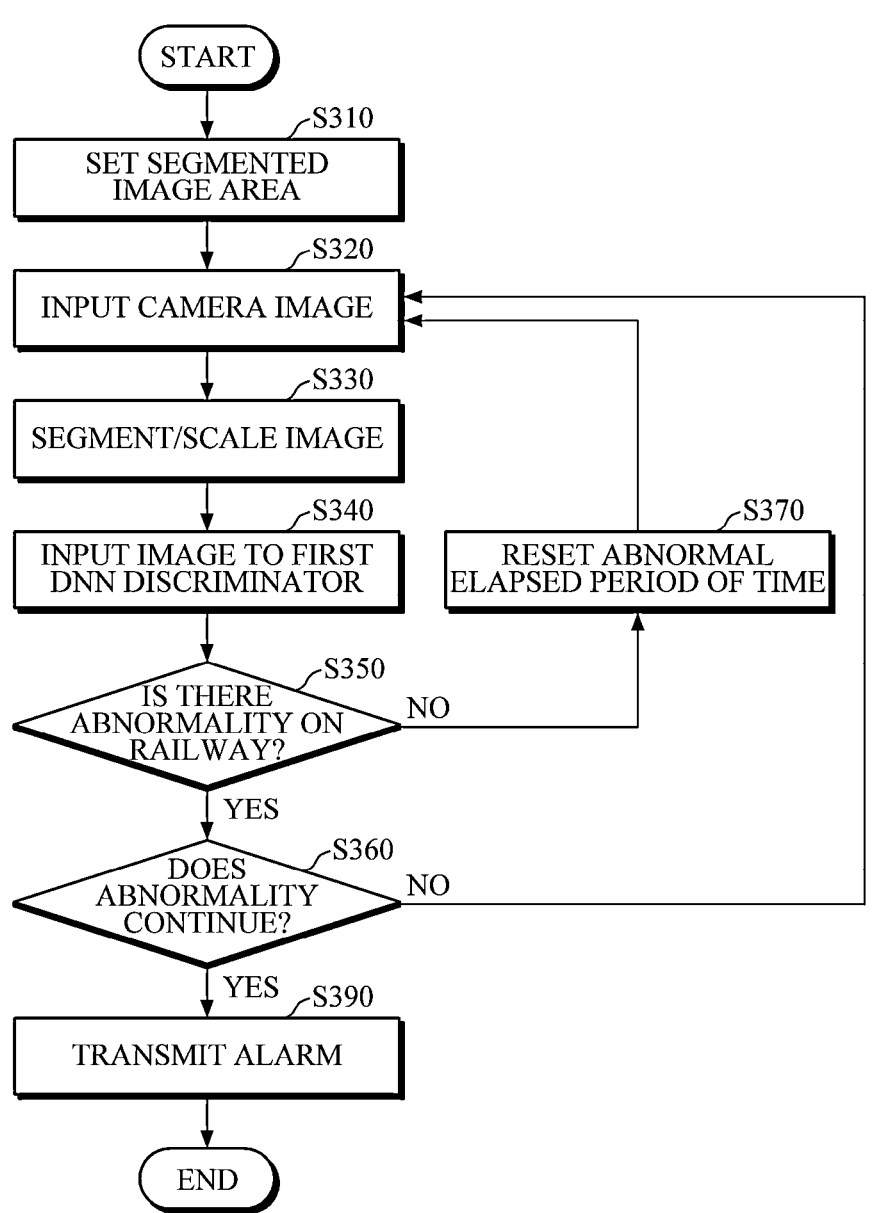
FIG. 12 is a flowchart illustrating a method of monitoring a railway disaster by the image processing unit of the railway disaster monitoring system according to the third embodiment.

FIG. 11 is a flowchart illustrating a method of monitoring a railway disaster by the railway disaster monitoring system according to the third embodiment, and FIG. 12 is a flowchart illustrating a method of monitoring a railway disaster by the image processing unit of the railway disaster monitoring system according to the third embodiment.

The image processing unit 200 automatically sets areas in which segmented images are to be generated (S310), and upon receiving an image from the camera (S320), the image processing unit 200 segments the image into set areas, and scales the segmented images to have a predetermined size to generate segmented image blocks (S330).

The image processing unit 200 inputs the segmented image blocks to the first DNN discriminator (S340), and determines whether the railway is in a normal state or an abnormal state in which a foreign matter is present (S350). When it is determined that the railway is in the normal state, a period of elapsed time for the corresponding block in the abnormal state is initialized (S370), and the process (S320) of receiving the image from the camera at the preset measurement time period is repeated.

When it is determined that the railway is in the abnormal state, it is determined whether the period of elapsed time for the corresponding block in the abnormal state is greater than or equal to a preset abnormal state duration (S360). When the period of elapsed time for the corresponding block in the abnormal state is smaller than the preset abnormal state duration, the image is received again from the camera at a predetermined period (S320), and the railway monitoring is repeated.

When the period of elapsed time for the corresponding block in the abnormal state is greater than or equal to the preset abnormal state duration and thus there is a block that is determined to be in an abnormal state even in the input image after the set abnormal state duration has elapsed in consideration of a period of time during which the train passes through the railway, the image processing unit 200 may generate an alarm for an external device (S390). The alarm may be transmitted to the rail management server 300, the speaker, the manager's terminal, or the like, which is connected to the wired/wireless network.

Figure 13:
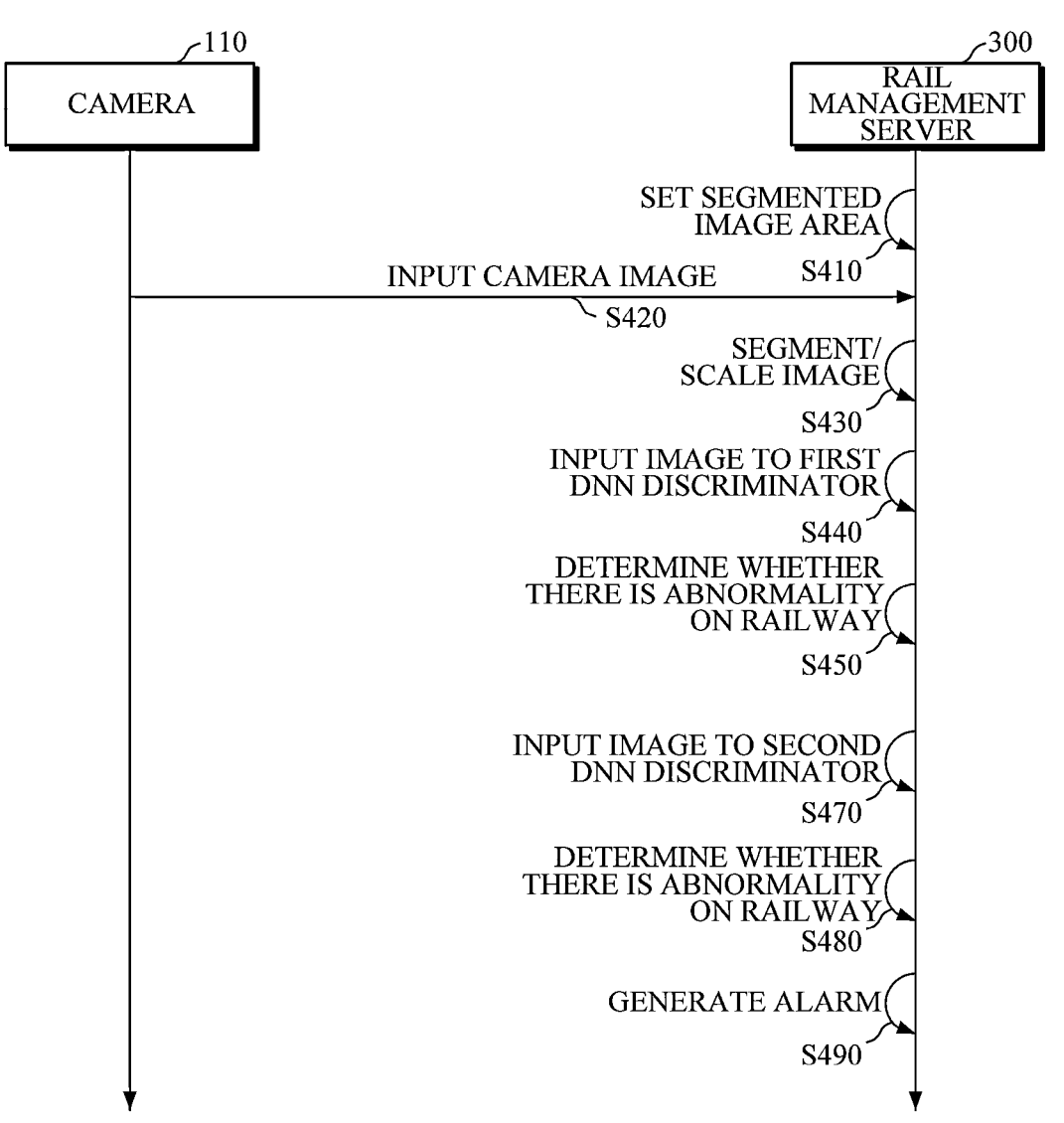
FIG. 13 is a flowchart illustrating a method of monitoring a railway disaster by the railway disaster monitoring system according to the fourth embodiment.
Figure 14:
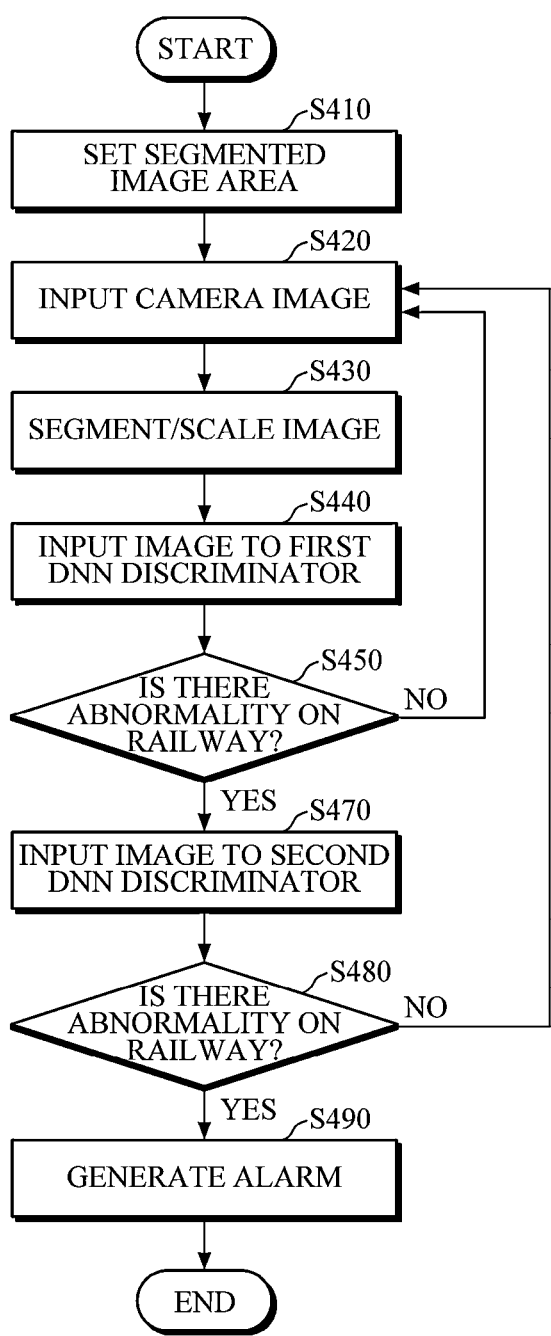
FIG. 14 is a flowchart illustrating a method of monitoring a railway disaster by a rail management server of the railway disaster monitoring system according to the fourth embodiment.

FIG. 13 is a flowchart illustrating a method of monitoring a railway disaster by the railway disaster monitoring system according to the fourth embodiment, and FIG. 14 is a flowchart illustrating a method of monitoring a railway disaster by a rail management server of the railway disaster monitoring system according to the fourth embodiment.

The rail management server 300 automatically sets areas in which segmented images are to be generated (S410), and upon receiving an image from the camera 110 (S420), the rail management server 300 segments the image into set areas, and scales the segmented images to have a predetermined size to generate segmented image blocks (S430).

The rail management server 300 inputs the segmented image blocks to the first DNN discriminator (S440), and determines whether the railway is in a normal state or an abnormal state in which a foreign matter is present (S450). When it is determined that the railway is in the normal state, the process (S420) of receiving the image from the camera at the preset measurement time period is repeated.

When it is determined that the railway is in the abnormal state, the rail management server 300 inputs the segmented image blocks to the second DNN discriminator (S470), and determines whether the railway is in a normal state or an abnormal state in which a foreign matter is present (S480).

When it is determined that the railway is in the abnormal state, the rail management server 300 may generate an alarm (S490). The alarm may be transmitted to a speaker or a manager's terminal connected to the wired/wireless network.

According to the proposed invention, it is possible to input images obtained by segmenting an area of a railway image captured by a camera to a discriminator trained with a deep learning neural network and rapidly and accurately determine a foreign matter on a railway with a small number of computing resources. In particular, it is possible to automatically segment and scale an image according to a perspective and generate segmented image blocks to have the same size, and thus it is possible to accurately determine a foreign matter.

Furthermore, according to the proposed invention, a railway disaster monitoring system does not determine a train passing through a railway as a foreign matter on a railway by using an additional neural network discriminator according to a type of a foreign matter or by determining whether an abnormal state continues for more than a preset abnormal state duration in consideration of a period of time during which the train passes.

While embodiments of the present invention have been described with reference to the accompanying drawings, the present invention is not limited to the embodiments. It should be interpreted that various modifications that can be apparently made by those skilled in the art are included in the scope of the present invention. The appended claims are intended to cover such modified embodiments.

What is claimed is:

1. An image processing unit of a railway disaster monitoring system for monitoring a foreign matter on a railway, the railway disaster monitoring system including a camera and the image processing unit that receives a railway image captured by the camera, the image processing unit comprising:

a segmented image acquisition unit configured to obtain a plurality of segmented images including a rail from the railway image received from the camera and scale the segmented images to obtain segmented image blocks of a predetermined size; and a segmented image determination unit which includes a first deep neural network (DNN) discriminator trained with a deep learning neural network and inputs the segmented image blocks to the first DNN discriminator to determine whether the railway is in a normal state in which there is no foreign matter on the railway, wherein the image processing unit further comprises a segmented image area setting unit configured to set areas of the plurality of segmented images that are gradually reduced according to a perspective of the rail in the railway image received from the camera.

2. The image processing unit of the railway disaster monitoring system of claim 1, wherein the segmented image determination unit further includes a segmented image verification unit that, when it is determined by the first DNN discriminator that there is a block in which the railway is not determined to be in the normal state, checks whether the block is still not determined to be in the normal state even after an abnormal state duration has elapsed.

3. The image processing unit of the railway disaster monitoring system of claim 1, further comprising an alarm transmission unit configured to transmit an alarm to an external device when it is determined by the segmented image determination unit that there is a foreign matter on the railway.

4. An image processing unit of a railway disaster monitoring system for monitoring a foreign matter on a railway, the railway disaster monitoring system including a camera and the image processing unit that receives a railway image captured by the camera, the image processing unit comprising:

a segmented image acquisition unit configured to obtain a plurality of segmented images including a rail from the railway image received from the camera and scale the segmented images to obtain segmented image blocks of a predetermined size; and a segmented image determination unit which includes a first deep neural network (DNN) discriminator trained with a deep learning neural network and inputs the segmented image blocks to the first DNN discriminator to determine whether the railway is in a normal state in which there is no foreign matter on the railway, wherein the segmented image determination unit further includes a second DNN discriminator that receives the segmented image blocks and further checks whether an abnormal state of the railway determined by the first DNN discriminator is correct when it is not determined by the first DNN discriminator that the railway is in the normal state, wherein the second DNN discriminator is trained with the deep learning neural network.

5. A rail management server of a railway disaster monitoring system for monitoring a foreign matter on a railway, the railway disaster monitoring system including a camera, an image processing unit including a segmented image acquisition unit that obtains a plurality of segmented images including a rail from a railway image received from the camera and scales the segmented images to obtain segmented image blocks of a predetermined size, and a first deep neural network (DNN) discriminator that determines whether the railway is in a normal state in which there is no foreign matter on the railway, and the rail management server connected to the image processing unit via a network, wherein the rail management server includes a second DNN discriminator trained with a deep learning neural network and configured to receive the segmented image blocks and further check whether an abnormal state of the railway determined by the first DNN discriminator is correct when it is not determined by the first DNN discriminator that the railway is in the normal state.

6. The rail management server of the railway disaster monitoring system of claim 5, further comprising an alarm transmission unit configured to transmit an alarm to an external device when it is determined by the second DNN discriminator that there is a foreign matter on the railway.

7. A rail management server of a railway disaster monitoring system for monitoring a foreign matter on a railway, the railway disaster monitoring system including a camera and a rail management server which is connected to the camera via a network to receive a railway image captured by the camera, the rail management server comprising:

a segmented image acquisition unit configured to obtain a plurality of segmented images including a rail from the railway image received from the camera and scale the segmented images to obtain segmented image blocks of a predetermined size; and a segmented image determination unit which includes a first deep neural network (DNN) discriminator trained with a deep learning neural network and inputs the segmented image blocks to the first DNN discriminator to determine whether the railway is in a normal state in which there is no foreign matter on the railway, wherein the rail management server further comprises a segmented image area setting unit configured to set areas of the plurality of segmented images that are gradually reduced according to a perspective of the rail in the railway image received from the camera.

8. The rail management server of the railway disaster monitoring system of claim 7, wherein the segmented image determination unit further includes a segmented image verification unit that, when it is determined by the first DNN discriminator that there is a block in which the railway is not determined to be in the normal state, checks whether the block is still not determined to be in the normal state even after an abnormal state duration has elapsed.

9. The rail management server of the railway disaster monitoring system of claim 7, further comprising an alarm transmission unit configured to transmit an alarm to an external device when it is determined by the segmented image determination unit that there is a foreign matter on the railway.

10. A rail management server of a railway disaster monitoring system for monitoring a foreign matter on a railway, the railway disaster monitoring system including a camera and a rail management server which is connected to the camera via a network to receive a railway image captured by the camera, the rail management server comprising:

a segmented image acquisition unit configured to obtain a plurality of segmented images including a rail from the railway image received from the camera and scale the segmented images to obtain segmented image blocks of a predetermined size; and a segmented image determination unit which includes a first deep neural network (DNN) discriminator trained with a deep learning neural network and inputs the segmented image blocks to the first DNN discriminator to determine whether the railway is in a normal state in which there is no foreign matter on the railway, wherein the segmented image determination unit further includes a second DNN discriminator that receives the segmented image blocks and further checks whether an abnormal state of the railway determined by the first DNN discriminator is correct when it is not determined by the first DNN discriminator that the railway is in the normal state, wherein the second DNN discriminator is trained with the deep learning neural network.

\*    \*    \*    \*    \*